United States Patent [19]

Che

[11] Patent Number: 4,942,492
[45] Date of Patent: Jul. 17, 1990

[54] WIPING DEVICE FOR MAGNETIC TAPE CASSETTES

[76] Inventor: Ay C. Che, No. 1-4, Alley 44, Lane 149, Kuo Ching Rd., Pan-Chiao, Taipei Hsien, Pan-Chiao, Taiwan

[21] Appl. No.: 283,630

[22] Filed: Dec. 13, 1988

Related U.S. Application Data

[63] Continuation-in-part of Ser. No. 35,902, Apr. 8, 1987, abandoned.

[51] Int. Cl.$^5$ .............................................. G11B 23/02
[52] U.S. Cl. .............................. 360/132; 15/DIG. 13
[58] Field of Search ............................... 360/132, 137; 15/DIGS. 12–13

[56] References Cited

U.S. PATENT DOCUMENTS 4,847,718  7/1989  Miller .................................. 360/132

Primary Examiner—A. J. Heinz

[57] ABSTRACT

A wiping device for a magnetic tape cassette is provided with an elastic main body having a securing element cooperable with a cassette housing so that the main body can be mounted to and removed from the housing from the outside of the cassette without dismantling the secured upper and lower cases. A wiping or cleaning/erasing element is supported by the main body and has a curved operation surface. When the main body is mounted to the housing, and the magnetic tape is loaded to an operation position by a magnetic recording and reproducing apparatus, the magnetizable surface of the magnetic tape contacts an effective area of the curved operation surface. When the magnetic tape is loaded and moved by the apparatus, the magnetic tape exerts an urging force to the wiping element, and the elastic main body urges the wiping element to exert a predetermined urging pressure to the magnetic tape against the urging force, so that the effective area of the curved operation surface can snugly contact the magnetizable surface to perform tape cleaning and/or erasing processes.

12 Claims, 9 Drawing Sheets

WIPING DEVICE FOR MAGNETIC TAPE CASSETTES

CROSS-REFERENCE TO RELATED APPLICATIONS

This is a continuation-in-part of U.S. patent application Ser. No. 035,902, filed on April 8, 1987, now abandoned.

BACKGROUND OF THE INVENTION

The present invention relates to a wiping device for magnetic tape cassettes, and more particularly to such a device capable of being easily mounted to and removed from a cassette for selectively achieving cleaning and-/or erasing purposes.

In this application, the term "wiping device" is limited to a cleaning and/or erasing device since the present invention can be used as a cleaning device, an erasing device, or a cleaning and erasing device, depending on the mounting of a cleaning material and/or a magnet on a main body of same structure.

In the usage of a magnetic recording and reproducing apparatus, such as a video tape player/recorder or audio tape player/recorder, there is, sometimes, a need of only erasing the contents previously recorded in the magnetic tape without re-recording new contents. However, there is not an easy, cheap and satisfactory manner to achieve this purpose to data. In addition, in reproducing or recording period, the magnetic tape of the audio or video tape cassette passes through the magnetic head of a tape player/recorder or video player/recorder, and the magnetizable surface of the magnetic tape keeps contact with the magnetic head. As used in the specification, the term "magnetizable surface" is defined as one of the surfaces of the magnetic tape which contacts the magnetic head in operation. Therefore, some of the oxides and dusts on the magnetizable surface of the magnetic tape will accumulate on the magnetic head and in the vicinity of the passing path of the magnetic tape. As a result, the signals are susceptible to distortion, the sound or picture quality is reduced, and the passing path of the magnetic tape may shift. Currently, the method to avoid this problem is to clean the magnetic head with a cleaning liquid or cleaning tape after operating the machine for a period of time. However, such cleaning processes are time-consuming and inconvenient.

In the examination of the above-mentioned parent application of this CIP application, six references are cited. The references includes U.S. Pat. No. 4,285,020 issued to Sato and August 18, 1981, U.S. Pat. No. 4,639,967 issued to Bordignon on February 3, 1987, U.S. Pat. No. 4,660,115 issued to Westfall et al. on April 21, 1987, U.S. Pat. No. 4,712,148 issued to Balz et al. on December 8, 1987, U.S. Pat. No. 4,276,575 issued to Schoettle et al. on June 30, 1981, and U.S. Pat. No. 4,509,087 issued to Jager et al. on April 2, 1985. Among the references, Jager's patent, relating to a tape grounding element, is considered relevant to the parent application. Referring to Jager's FIGS. 5 and 6, Jager's patent disclosed that a resilient element 26 can be inserted from outside into the finished magnetic-tape cassette, but it also disclosed that the resilient element 26 comprises a limb 40 projecting therefrom to abut against a stop 41 fromed by a portion of the cassette wall 8, so as to prevent the resilient element 26 from being removed from the cassette (seeing Jager's FIG. 6, and lines 1 to 10, column 3 and lines 6 to 17, column 7 of Jager's specification). That is to say, Jager teaches that the resilient element can be inserted into but cannot be removed away out of the cassette from outside. This is due to the fact that the tape grounding element need not be changed by a new one even after a long-period usage, and is suitable to be permanently mounted in the cassette. This is quite different from the case of acting as an erasing or cleaning device. Moreover, the unremovable resilient element is strongly suggested by Jager, also seeing its other structures in FIGS. 7 to 15. Anyone who reads Jager's specification will by no means be implied that, in some cases, the resilient element may preferably be removavlbe out of the cassette from outside.

Referring to Jager's FIGS. 5 to and 6, and FIG. 1 of this application, the arm 27 is very narrow, about one seventh of the width of the magnetic tape 7. As those skilled in the art know, the width of the magnetic tape 7 is ½ inch, i.e. about 1,265 cm, and thus the width of the arm 27 is about 0.18 cm. It is clear that Jager's resilient element 22 with a pad or magnet mounted on the arm 27 still cannot act as a practicable cleaning device or erasing device because it can only clean or erase the part of one seventh of the entire magnetic tape.

Furthermore, Jager's magnetic-tape cassette is a quite unique cassette, as described in the first paragraph of column 1 in Jager's text, and the structure of the cassette must be altered to mate the Jager's resilient element, seeing from Jager's FIG. 5 through FIG. 15. As those skilled in the art know, Jager's cassette is applicable only to the special video tape recorder, Model VR-2020, which are manufactured and sold by Philips Corporation, Holland, in 1980, and then stopped manufacturing before long. The magnetic-tape loading system of Jager's cassette is illustrated in FIG. 2 of this application. As seen from FIG. 3 of this application, the arm 27 always contacts the surface of the magnetic-tape 7 along a line whether or not the magnetic-tape 7 is loaded. Therefore, its erasing or cleaning effect is not satisfactory even if it is applied as an erasing or cleaning device.

SUMMARY OF THE INVENTION

The primary object of the present invention is to provide a wiping device for magnetic tape cassettes, which can be mounted onto and removed from the cassette from the outside of the cassette. This feature is particularly advantageous when the invention is applied as a cleaning and/or erasing device for tape cassette. In the former case, it is necessary to change a new cleaning device when the old one becomes dirty. In the latter case, it it necessary to selectively install the erasing device on or remove it from the cassette, depending on whether or not the user wants to erase the recorded content of the magnetic tape. In either case, the present invention can easily achieve the purpose without dismantling the cassette.

Another object of the present invention is to provide a wiping device for magnetic tape cassettes, which can maintain snug contact with the magnetic tape in an effective area.

According to the present invention, a wiping device for a magnetic tape cassette, which cassette is adapted for inserting into a magnetic recording and reproducing apparatus and for removing from the apparatus, and includes a generally rectangular box-like housing formed by an upper case section and a mating lower case section disposed in opposing relation and secured together to define a generally enclosed chamber, a supply reel and a take-up reel supported within the chamber between the case sections for rotation on parallel spaced axes, and a magnetic tape having a magnetizable surface, the magnetic tape being wound on the supply reel and having a leading end portion connected to the take-up reel. The wiping device comprises an elastic main body, securing means on the main body cooperable with means on the housing so that the main body can be mounted to and removed from the housing from the outside of the cassette without dismantling the cassette, and wiping means supported by the main body and having a curved operation surface. When the main body is mounted to the housing, and the magnetic tape is arranged to an operation position by the apparatus, the magnetizable surface of the magnetic tape contacts an effective area of the curved operation surface. When the magnetic tape is in the operation position and is moved by the apparatus, the magnetic tape exerts an urging force to the wiping means, and the elastic main body urges the wiping means to exert a predetermined urging pressure to the magnetic tape against the urging force, so that the effective area of the curved operation surface can substantially snugly contact the magnetizable surface.

BRIEF DESCRIPTION OF THE DRAWINGS

The present invention can be more fully understood by reference to the following detailed description and accompanying drawings, which form an integral part of this application.

DETAILED DESCRIPTION OF THE PREFERRED EMBODIMENTS

Figure 1:
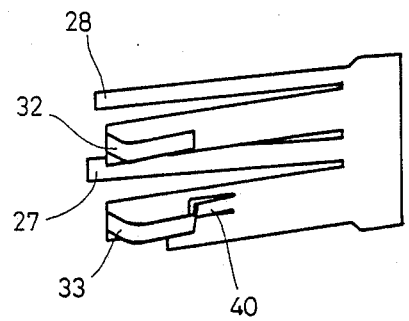
FIG. 1 is a perspective view of a prior tape grounding element.
Figure 2:
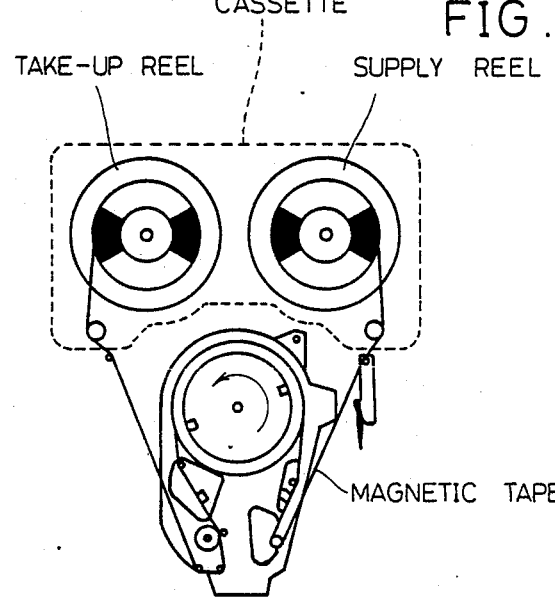
FIG. 2 is a schematic diagram of a tape loading system for one kind of tape cassette in which the tape grounding element of FIG. 1 is to be mounted.
Figure 3:
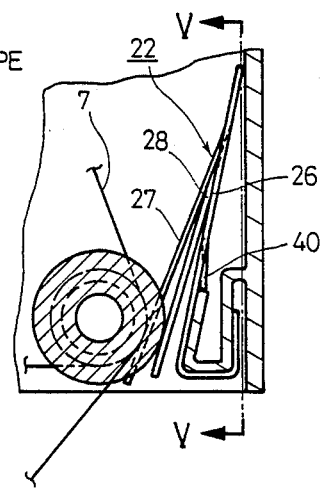
FIG. 3 is a sectional plan view of a part of the cassette of FIG. 2, wherein the tape has been loaded, with the tape grounding element mounted thereon.
Figure 4:
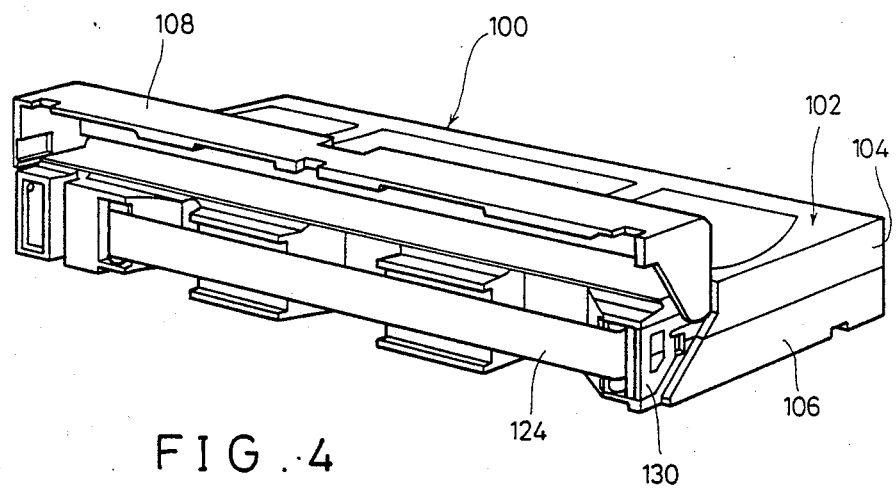
FIG. 4 is a perspective view of a VHS video tape cassette with its protective cover opened.

FIG. 4 illustrates a commercially-availably standard VHS tape cassette 100. At present, various tape cassettes, including VHS, BETA, 8 mm, VHS-C, compact tape cassette, and the like, have respective inner and outer structure standards, size and configuration standards, except some cassettes which are designed for particular equipments or purposes, such as Jager's and Westfall's cassettes. The object of the present invention is to provide a wiping device which is individually sold to the user for her or him to directly and easily mount it onto the cassette available on his or her hand by himself or herself without alerting the structure of the cassette. In this application, the term "commercially-availably standard cassette" is thus limited to the cassette which is prevalently sold in the market and commonly used by the public.

Figure 8:
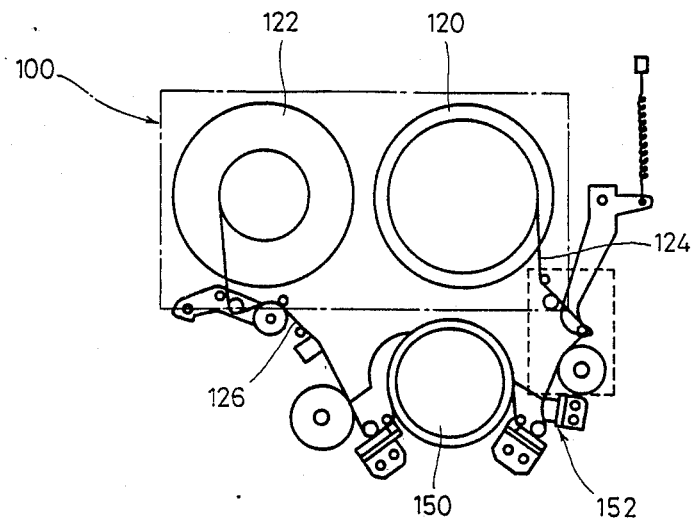
FIG. 8 is a schematic diagram of a tape loading system for the VHS tape cassette.

The cassette 100 including a housing 102 formed by an upper case section 104 and a lower case section 106 each of which is injection molded of a rigid plastics material. The mating case sections 104 and 106 are arranged in opposing relation and are rigidly secured together by a series of screws (not shown). The cassette 100 also includes a tape protection cover 108 which is molded of a rigid plastics material and is supported by the upper case section 104 for pivotal movement between a lower tape covering position and an upper retracted (FIG. 4) position. As shown in FIG. 8, the cassette housing 102, formed by the case sections 104, 106, and 108, encloses a spool-like circular tape supply reel 120 and an identical circular take-up reel 122. A magnetic tape 124 is wound on the supply reel 120, and a leading end portion 126 of the tape 124 extends and connects to the take-up reel 122. Since the cassette is well-known by those skilled in the art, no detailed description is deemed necessary.

Figures 5A, 5B:
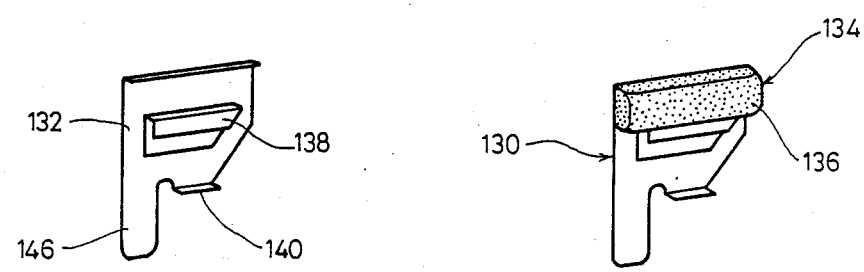
FIGS. 5(a) and 5(b) are perspective views of a wiping device according to the first preferred embodiment of the present invention.

Referring now to FIGS. 5(a) and 5(b), a wiping device 130 for the VHS tape cassette in accordance with the first embodiment includes an elastic main body 132 made of an elastic material, such as PE, PP, PVC, PS, celluloid, metal, or other suitable materials, and a cleaning pad 134 secured to the main body 132 in any suitable manners, such as adhering or retaining technique, as shown in FIG. 5(b). The cleaning pad 134 has a front curved operation surface 136, and may be a felt pad or the like. The main body 132 includes a first and a second elastic clamping plates 138 and 140. The first elastic clamping plate 138 has a first portion extending outwards from the main body 123 and forming a generally right angle with the main body 132, and a second portion extending downwards from the first portion and forming a generally right angle with the first portion, as shown in FIG. 5(a). The second elastic clamping plate 140 extends outwards from the main body 132, and forms a generally right angle with the main body 132.

Figure 7A:
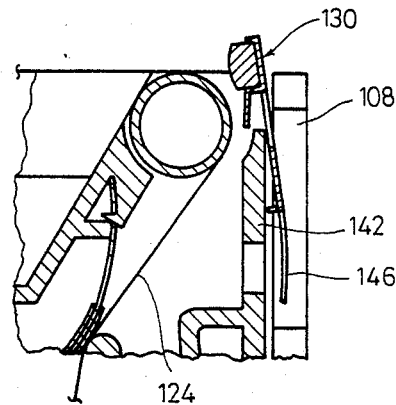
FIGS. 7(a) to 7(f) are sectional plan views of a part of the VHS tape cassette cooperated with the wiping device of FIG. 5(b), illustrating the mounting and removing steps of the wiping device onto and from the cassette.
Figure 7B:
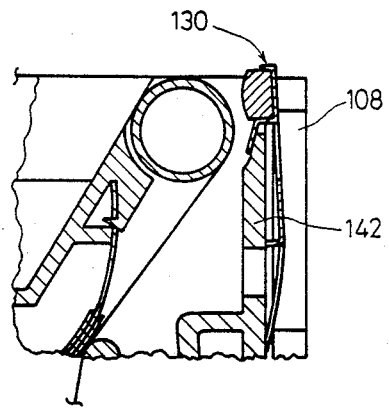
Figure 7C:
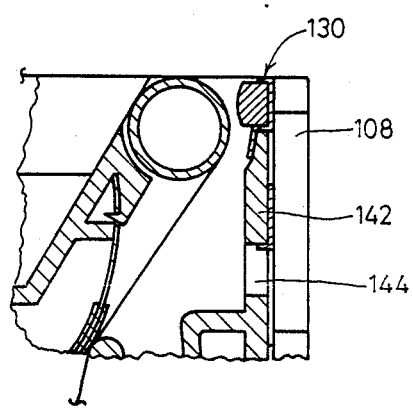
Figure 7D:
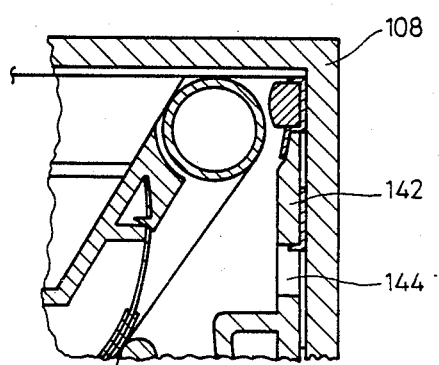
Figure 7E:
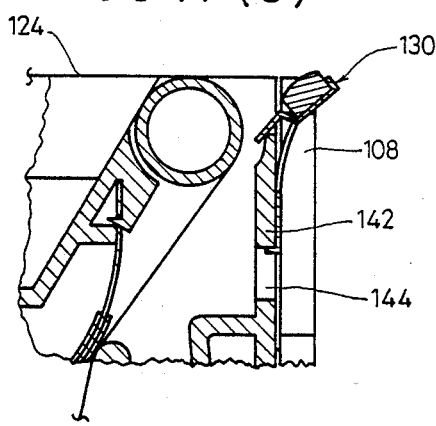
Figure 7F:
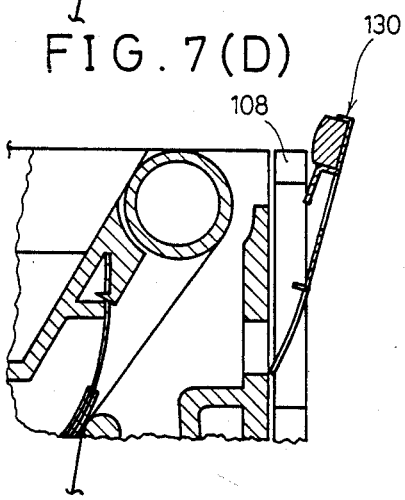

FIGS. 7(a) to 7(f) show cross-sectional views of the upper right corner of the VHS tape cassette (viewing from the back of the cassette) at which the wiping device 130 is suitable to be installed. FIGS. 7(a) to 7(d) show the mounting steps of the wiping device 130 onto the cassette. FIGS. 7(d) to 7(f) show the removing steps of the wiping device 130 from the cassette. In the installing operation, the user first opens the protective cover 108 of the cassette 100, and then inserts the wiping device 130 into the space between the protective cover 108 and a right plate 142 of the housing 102 with the first clamping plate 138 clamping on the right plate 142 and the second clamping plate 140 clamping on the inner wall of an opening 144 provided in the right plate 142 (seeing from FIG. 7(a) to FIG. 7(c)). The opening 144 is provided for the video player/recorder to detect the termination of the magnetic tape. Once the installment of the wiping device 130 has been finished, the cleaning pad 134 is located in the inner space of the housing and in the vicinity of the magnetizable surface of the magnetic tape 124. Finally, the protective cover 108 is closed as shown in FIG. 7(d). In the removing operation, the protective cover 108 is first opened, and then push the cleaning pad 134 rightwards with fingers. As a result, the main body 132 will be deformed tto facilitate the removing operation, as shown in FIG. 7(e). It is clear that the wiping device 130 can be easily and rapidly mounted to and removed from the cassette 100 from the outside of the cassette 100 without dismantling the secured upper and lower case sections 104 and 106.

The main body 132 may be further provided with a guide member 146 extending downwards therefrom and slightly bending toward the right plate 142 of the housing to facilitate the closing of the protective cover 108 and prevent the cover 108 from being hindered by the main body 132 when the wiping device 130 is installed thereon.

Figure 9:
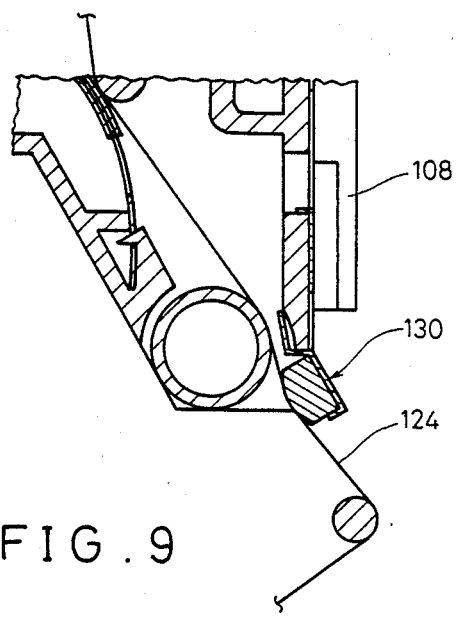
FIG. 9 is a sectional plan view of a part of the VHS tape cassette, wherein the tape has been loaded, with the wiping device of FIG. 5(b) mounted thereon.

With reference to FIG. 8, the magnetic tape 124 of the VHS cassette 100 is loaded to an operation position in a video player/recorder (not shown), i.e. the tape 124 is wrapped around a magnetic head or drum 150 by a loading mechanism 152 when the cassette 100 is inserted into a video player/recorder and the play key or button of the video player/recorder is depressed. Since the loading system is very familiar to the skilled person, no further detailed description is deemed necessary. When the tape 124 is loaded and moved by the video player/recorder, the tape 124 exerts an urging force or reverse tension to the cleaning pad 134, and the elastic main body 132 urges the cleaning pad 134 to exert a predetermined urging pressure, for example in the range of 0.5 to 2 g/mm$^2$, to the magnetizable surface of the tape 124 against the urging force due to its elastic capacity, as clearly shown in FIG. 9. As a result, the magnetizable surface of the tape 124 contacts an effective area of the curved operation surface 136 of the cleaning pad 134, and the effective area snugly contacts the tape 124 to perform an advantageous cleaning effect.

Based on the same main body 132 of the present invention, the cleaning pad 134 can be replaced by a magnet to form an erasing device for a magnetic tape. When the magnetic tape 124 passes through the magnet, the magnetic field of the magnet will erase the recorded contents in the tape and return it back to a blank tape.

Figures 6A, 6B:
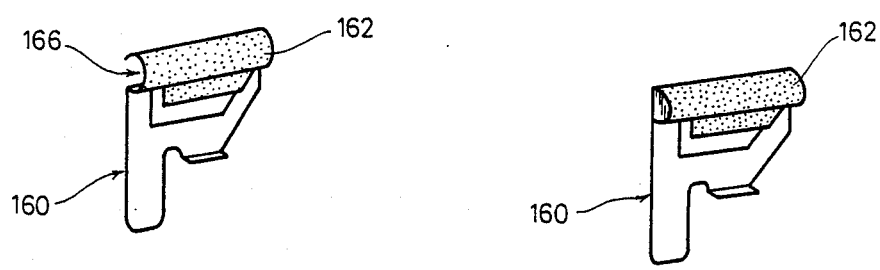
FIGS. 6(a) and 6(b) are perspective views of a wiping device according to the second preferred embodiment of the present invention.

Referring to FIGS. 6(a) and 6(b), a wiping device 160 according to another preferred embodiment is shown. The wiping device 160 is similar to the device 130 of FIGS. 5(a) or 5(b). The difference is that the main body of the device 160 includes an curved supporting member 162 forming a receiving groove 166. A plurality of cleaning flocks may be statically flocked on the curved supporting member 162 to form a cleaning means. Alternatively, a nonwoven fabric may be adhered to the member 162 to form a cleaning means. Moreover, a magnet 164 can be removably inserted into the receiving groove 166, so that the wiping device 160 can be used for magnetic tape cleaning and erasing purposes simultaneously.

Although the above description refers to a cleaning and/or erasing device for a VHS cassette, it should be understood that the present invention can be applied to any kinds of cassettes, such as BETA tape cassette, 8 mm tape cassette, VHS-C tape cassette, compact tape cassette and the like, by modifying and varying the shapes of the main body without departing from the spirit of the present invention.

Figure 10:
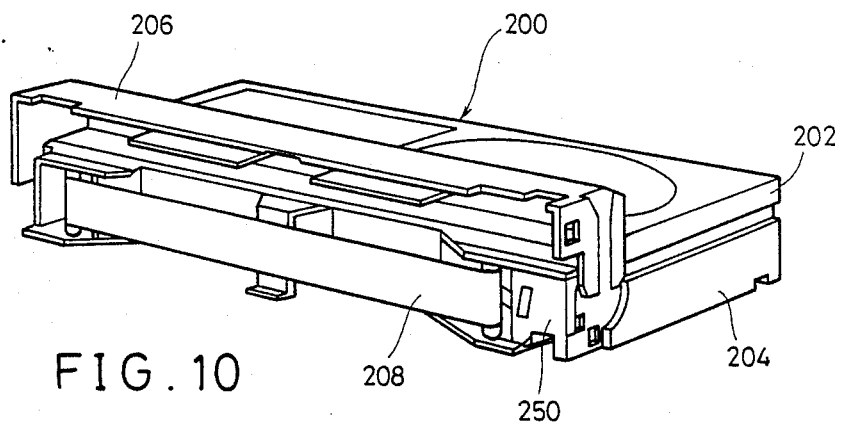
FIG. 10 is a perspective view of a BETA video tape cassette with its protective cover opened.
Figures 11A, 11B:
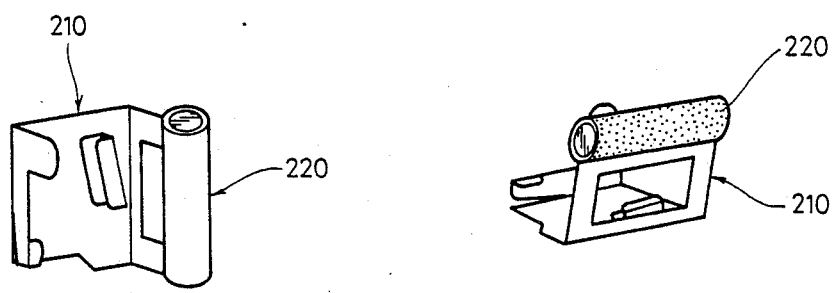
FIGS. 11(a) and 11(b) are perspective views of a wiping device according to the third preferred embodiment of the present invention.
Figures 12, 13:
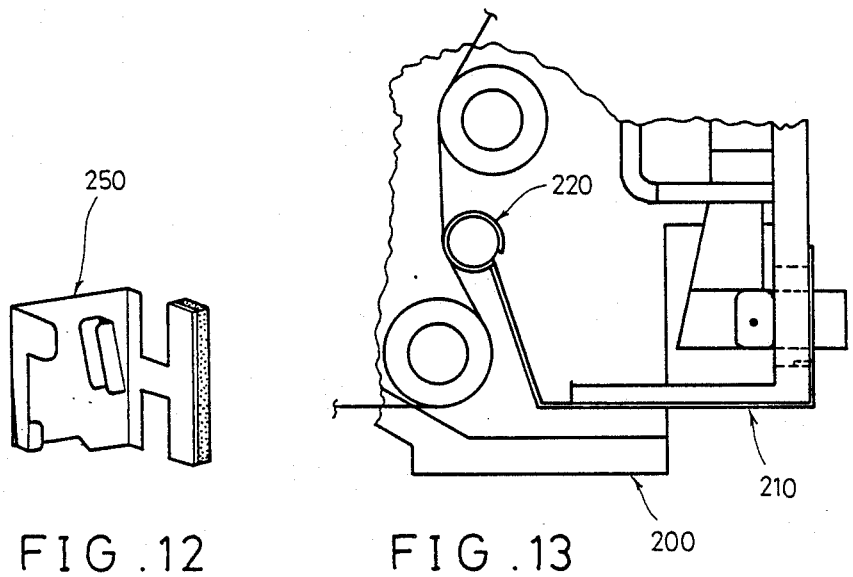
FIG. 12 is a perspective view of a wiping device according to the fourth preferred embodiment of the present invention.
FIG. 13 is a sectional plan view of a part of the BETA tape cassette with the wiping device of FIGS. 11(a) or 11(b) mounted thereon.
Figure 14A:
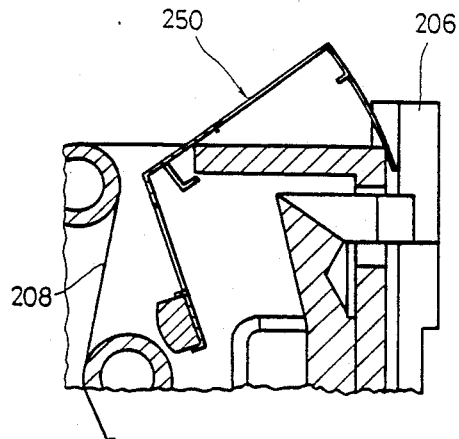
FIGS. 14(a) to 14(f) are sectional plan views of a part of the BETA tape cassette cooperated with the wiping device of FIG. 12, illustrating the mounting and removing steps of the wiping device onto and from the cassette.
Figure 14B:
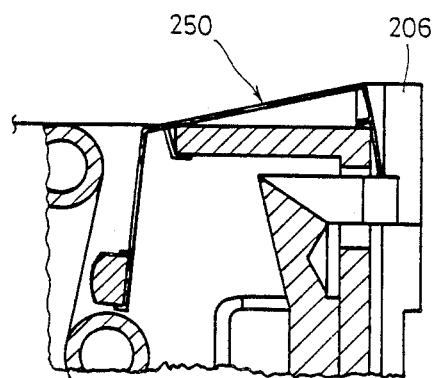
Figure 14C:
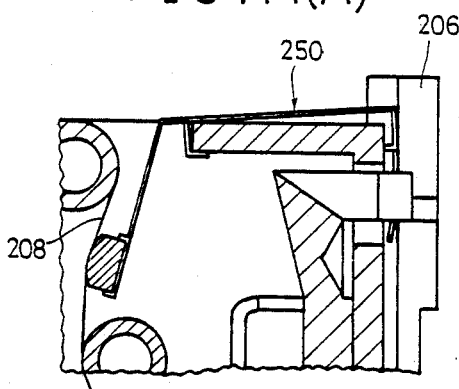
Figure 14D:
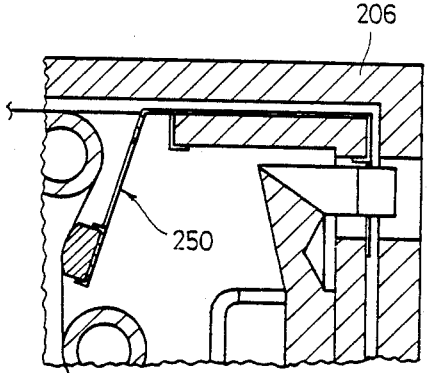
Figure 14E:
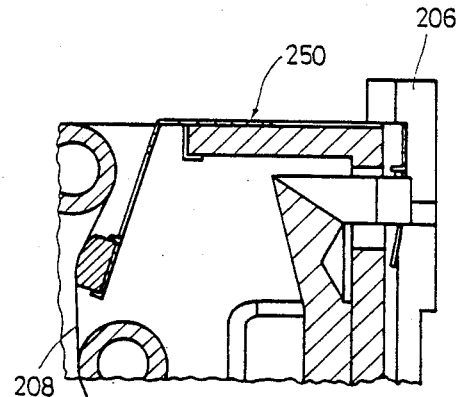
Figure 14F:
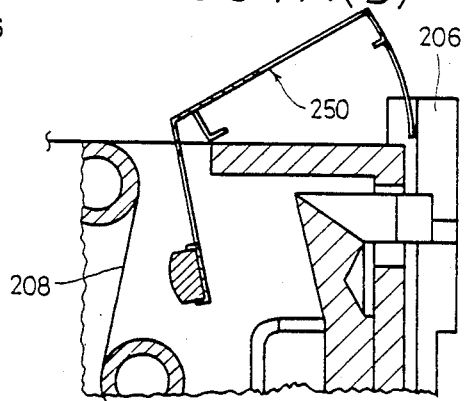

Referring to FIG. 10, a well-known BETA video tape cassette 200 is shown. The cassette 200 also includes a housing formed by an upper case section 202 and a lower case section 204, a protective cover 206, and a magnetic tape 208. With reference to FIGS. 11(a) 11(b) and 12, two wiping devices 210 and 250 according to other preferred embodiments of the present invention are illustrated. The wiping devices 210 and 250 are similar to the wiping devices 160 and 130 except their shapes, and also can be mounted to and removed from the housing of the cassette 200 from the outside of the cassette. In FIGS. 14(a) to 14(f), the mounting and removing steps of the wiping device 250 or 210 are illustrated. With reference to FIG. 13, once the wiping device 210 or 250 is installed on the cassette 200, the cleaning and/or erasing means 220 of the divece exerts an urging pressure to the magnetizable surface of the tape 208, so that the wiping device can perform advantageous cleaning and erasing effects simultaneously.

Figure 15:
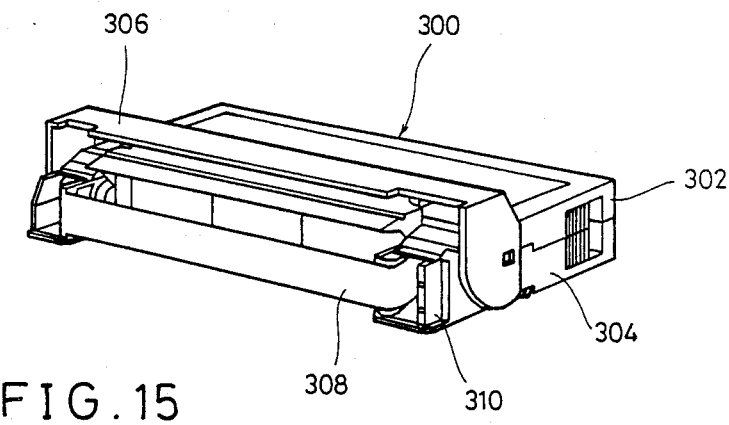
FIG. 15 is a perspective view of a 8 mm video tape cassette with is protective cover opened.
Figures 16, 17:
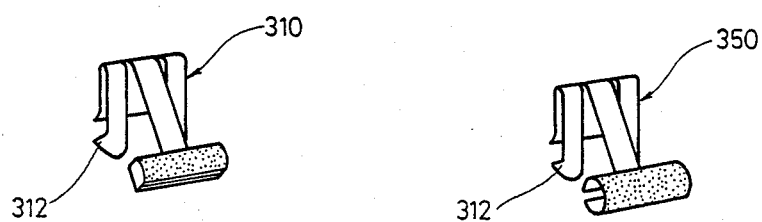
FIG. 16 is a perspective view of a wiping device according to the fifth preferred embodiment of the present invention.
FIG. 17 is a perspective view of a wiping device according to the sixth preferred embodiment of the present invention.
Figures 18A, 19A:
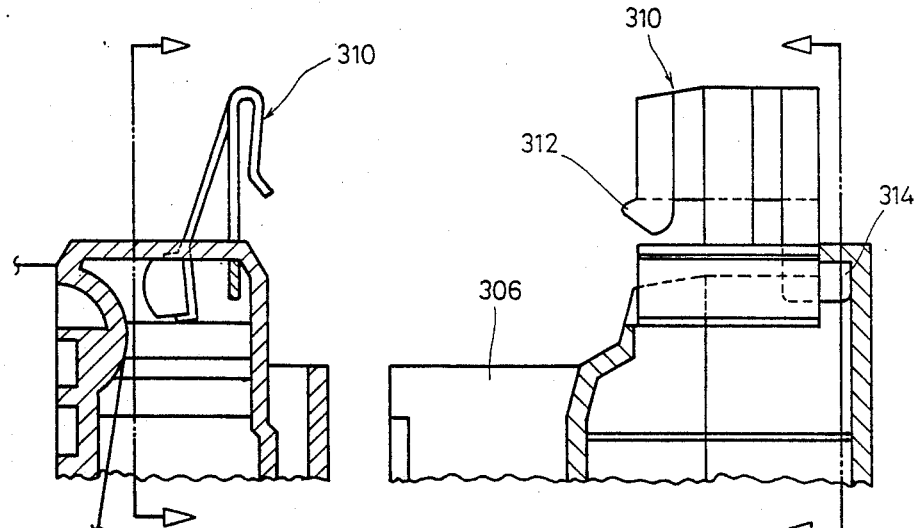
FIGS. 18(a) to 18c) are sectional plan views of a part of the 8 mm tape cassette cooperated with the wiping device of FIG. 16, illustrating the mounting steps of the wiping device onto the cassette.
FIGS. 19(a) to 19(c) are sectional side views of a part of the 8 mm tape cassette cooperated with the wiping device of FIG. 16, illustrating the mounting of the wiping device onto the cassette.
Figures 18B, 19B:
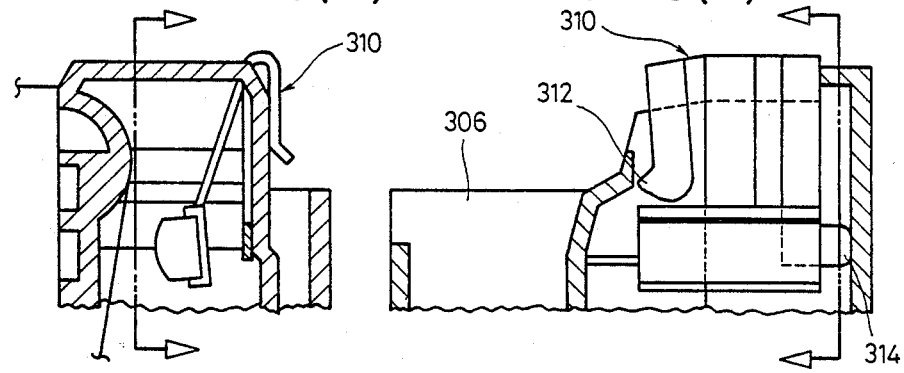
Figures 18C, 19C:
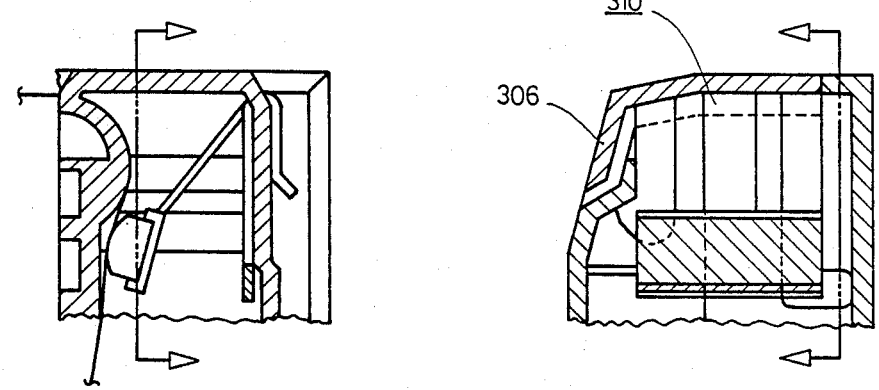

Referring to FIG. 15, a well-known 8 mm video tape cassette 300 is shown. The cassette 300 also includes a housing formed by an upper case section 302 and a lower case section 304, a protective cover 306, and a magnetic tape 308. With reference to FIGS. 16 and 17, two wiping devices 310 and 350 according to other preferred embodiments of the present invention are illustrated. The inventive spirits of the wiping devices 310 and 350 are similar to those of the wiping devices 160 and 130, and also can be mounted to and removed from the housing of the cassette 200 from the outside of the cassette. In FIGS. 18(a) to 18(c) and FIGS. 19(a) to 19(c), the mounting steps of the wiping device 310 or 350 are illustrated. As shown in FIGS. 19(a) to 19(c), the wiping device further includes two projecting toes 312 and 314 projecting outwards to abut against the inner walls of the case sections 302 and 304 of the cassette 300, so that the securing force is increased. With reference to FIG. 18(c), once the wiping device 310 or 350 is installed on the cassette 300, the cleaning or erasing means 320 of the device exerts an urging pressure to the magnetizable surface of the tape 208, so that the wiping devic can perform advantageous cleaning or erasing effect.

Figure 20:
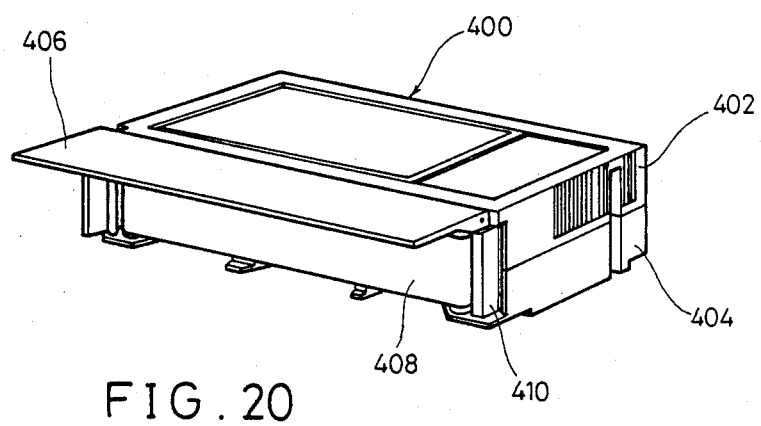
FIG. 20 is a perspective view of a VHS-C video tape cassette with its protective cover opened.
Figure 21:
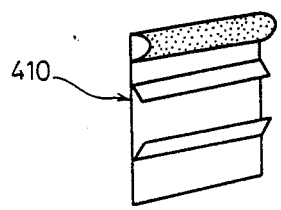
FIG. 21 is a perspective view of a wiping device according to the seventh preferred embodiment of the present invention.
Figure 22:
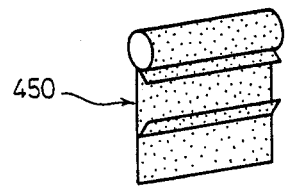
FIG. 22 is a perspective view of a wiping device according to the eighth preferred embodiment of the present invention.
Figure 23C:
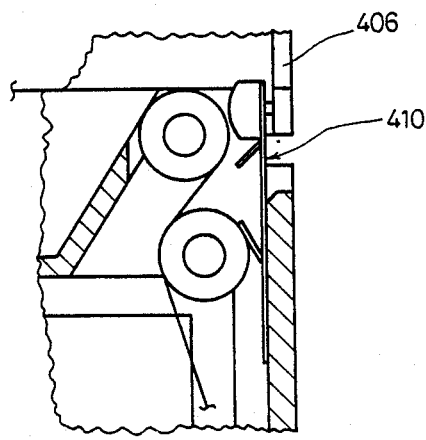
FIGS. 23(a) to 23(d) are sectional plan views of a part of the VHS-C tape cassette cooperated with the wiping device of FIG. 21, illustrating the removing steps of the wiping device from the cassette.
Figure 23A:
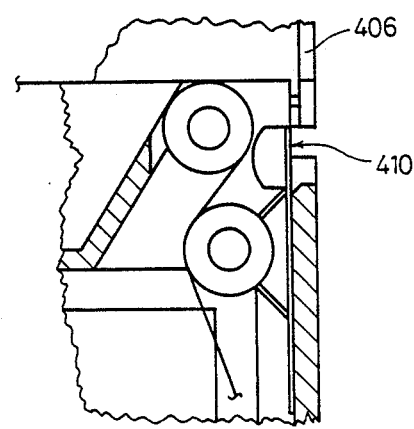
Figure 23B:
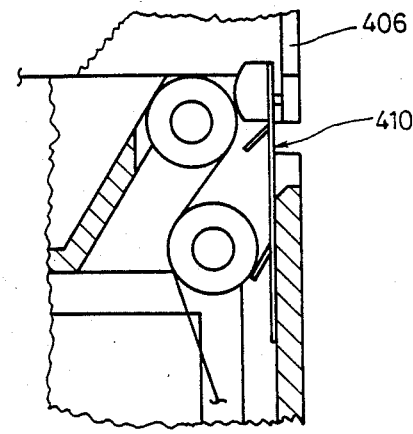
Figure 23D:
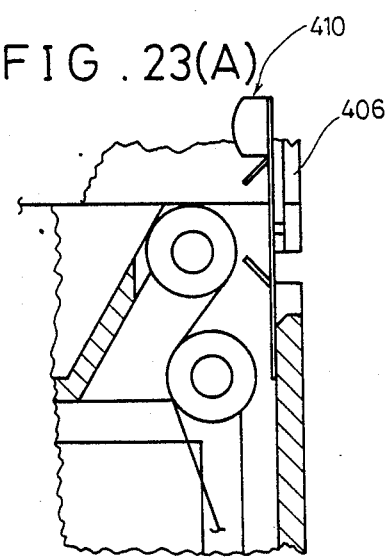

Referring to FIG. 20, a well-known VHS-C video tape cassette 400 is shown. The cassette 400 also includes a housing formed by an upper case section 402 and a lower case section 404, a protective cover 406, and a magnetic tape 408. With reference to FIGS. 21 and 22, two wiping devices 410 and 450 according to other preferred embodiments of the present invention are illustrated. The inventive spirit of the wiping devices 410 and 450 are similar to those of the wiping devices 160 and 130, and also can be mounted to and removed from the housing of the cassette 400 from the outside of the cassette. In FIGS. 23(a) to 23(d), the rmoving steps of the wiping device 410 or 450 are illustrated. As those skilled in the art well know, the loading system for the VHS-C cassette 400 is similar to that for the VHS cassette 100. Thus, when the wiping device 410 or 450 is installed on the cassette 200 and the tape 408 is loaded, the cleaning and/or erasing means of the device exerts an urging pressure to the magnetizable surface of the tape 408, so that the wiping device can perform advantageous cleaning and erasing effects simultaneously.

It should be understood that the magnet used by the present invention may be shaped in order to erase the content recorded in a single selected track or in several selected tracks of the magnetic tape. It should be also understood that the elastic main body may be integrally formed by an suitable process, or may be includes a plurality of pieces to simplify and facilitate the manufacturing process.

From the above description, it can be readily understood that the manufacturing cost of the present invention is very cheap, that the erasing and/or cleaning effect of the wiping device is good, and that the installment and removement of the wiping device can be rapidly and easily achieved by a user from the outside of the cassette.

While the invention has been described in connection with what is presently considered to be the most practical and preferred embodiments, it is to be understood that the invention is not to be limited to the disclosed embodiments but, on the contrary, is intended to cover various modifications and equivalent arrangements included within the spirit and scope of the appended claims which scope is to be accorded the broadest interpretation so as to encompass all such modifications and equivalent structures.

What is claimed is:

1. A wiping device for a magnetic tape cassette, which cassette is adapted for inserting into a magnetic recording and reproducing apparatus and for removing from said apparatus, and includes a generally rectangular box-like housing formed by an upper case section and a mating lower case section disposed in opposing relation and secured together to define a generally enclosed chamber, a supply reel and a take-up reel supported within said chamber between said case sections for rotation on parallel spaced axes, and a magnetic tape having a magnetizable surface, said magnetic tape being wound on said supply reel and having a leading end portion connected to said take-up reel, said device comprising:

an elastic main body, securing means on said main body copperable with means on said housing so that said main body can be mounted to and removed from said housing of said magnetic tape cassette from the outside of said housing without dismantling said secured upper and lower case sections; and wiping means supported by said main body and having a curved operation surface, when said main body is mounted to said housing, and said magnetic tape is arranged to an operation position by said apparatus, said magnetizable surface of said magnetic tape contacting an effective area of said curved operation surface, and when said magnetic tape is in said operation position and is moved by said apparatus, said magnetic tape exerting an urging force to said wiping means, and said elastic main body urging said wiping means to exert a predetermined urging pressure to said magnetic tape against said urging force, so that said effective area of said curved operation surface can substantially snugly contact said magnetizable surface.

2. A device as claimed in claim 1, wherein said magnetic tape cassette is a commercially-availably standard cassette, and wherein said main body is so configured as to secure to said housing without altering the structure of said housing.

3. A device as claimed in claim 1, wherein said main body includes supporting means extending from said securing means and having a curved member, and wherein said wiping means includes cleaning flocks statically flocked on said curved member, so that said device can be used for magnetic tape cleaning purpose.

4. A device as claimed in claim 3, wherein said curved member is configurated to form a receiving groove, and wherein said wiping means further includes a magnet removably inserted into said receiving groove, so that said device can be used for magnetic tape cleaning and erasing purposes simultaneously.

5. A device as claimed in claim 4, wherein said predetermined urging pressure is in the range of about 0.5–2.0 g/mm$^2$.

6. A device as claimed in claim 6, wherein said magnetic tape cassette is a commercially-availably standard cassette, and wherein said main body is so configured as to secure to said housing without altering the structure of said housing.

7. A device as claimed in claim 1, wherein said main body includes supporting means extending from said securing means, and wherein said wiping means includes a cleaning pad removably secured to said supporting means, so that said device can be used for magnetic cleaning purpose.

8. A device as claimed in claim 7, wherein said magnetic tape cassette is a commercially-availably standard cassette, and wherein said main body is so configurated as to secure to said housing without altering the structure of said housing.

9. A device as claimed in claim 1, wherein said main body includes supporting means extending from said securing means and wherein said wiping means includes a magnet removably secured to said supporting means, so that said device can be used for magnetic erasing purpose.

10. A device as claimed in claim 9, wherein said magnetic tape cassette is a commercially-availably standard cassette, and wherein said main body is so configurated as to secure to said housing without altering the structure of said housing.

11. A device as claimed in claim 1, wherein said magnetic tape cassette is a VHS video tape cassette having a protective cover pivotally connected to said upper case section of said housing, when said cassette is inserted into said magnetic recording and reproducing apparatus, said protective cover being opened, and when said cassette is removed from said aparatus, said protective cover being closed, and wherein said main body further includes guiding means for guiding said protective cover during its closing procedure in order to prevent said protective cover from being hindered by said main body.

12. A device as claimed in claim 1, wherein said magnetic tape cassette is a BETA video tape cassette having a protective cover pivotally connected to said upper case section of said housing, when said cassette is inserted into said magnetic recording and reproducting apparatus, said protective cover being opened, and when said cassette is removed from said apparatus, said protective cover being closed, and wherein said main body further includes guiding means for guiding said protective cover during its closing procedure in order to prevent said protective cover from being hindered by said main body.

* * * * *